Patented Jan. 19, 1937

2,068,607

UNITED STATES PATENT OFFICE 2,068,607

STABILIZED ALKYL HALIDE AND PROCESS OF STABILIZATION

John F. Olin, Philadelphia, Pa., assignor to The Sharples Solvents Corporation, Philadelphia, Pa., a corporation of Delaware No Drawing. Application October 13, 1934, Serial No. 748,196

8 Claims. (Cl. 23—250)

This invention relates to an improved composition especially adapted for use as a solvent and to a method for its production. Although it is contemplated to use the new composition for any purpose for which it may be found suitable, its use as a solvent in many instances is suggested and its use in lacquers, varnishes or other protective coatings has been found particularly advantageous.

Numerous organic compounds and mixtures of such compounds are now in commercial use as solvents and many others have been proposed for this use and discarded as unsatisfactory. Characteristics particularly affecting the desirability of compositions for such use include stability, volatility, and, of course, the ability to dissolve the substances that it is desired to dissolve. The cost or availability of the compositions is also of major importance.

Consideration being given to the use as solvents of amyl chlorides and like compounds such as butyl, hexyl and heptyl chlorides and to corresponding compounds formed with other halogens, it was found that while some of these compounds or mixtures containing one or more of them can be economically produced and have many of the attributes of a satisfactory commercial solvent, difficulty is encountered because the compositions are relatively unstable and decompose upon standing or under the conditions of use. Highly undesirable and corrosive substances are formed by such decomposition.

Accordingly it is the purpose of the present invention to eliminate the difficulty encountered by reason of the instability of these compounds and to produce, expeditiously and economically, stabilized compounds of the general class described or mixtures thereof. It is also an object of this invention to provide an inexpensive, but stable organic composition having approximately the properties of members or mixtures of members of the general class of alkyl halides of which examples have been given. One of the practical purposes of producing such compounds is to provide a solvent for use either in lacquer or other compositions, that is advantageous particularly because it may be economically produced and is satisfactorily stable.

The new composition is a mixture of one or more halogenated alkanes with a substantial proportion of an olefin, such as amylene or some compound or mixture of compounds closely related thereto in their properties. Butylene, hexylene and heptylene are such compounds. Obviously, since there are numerous halogenated alkanes and numerous olefines, a large variety of combinations may be made by a skilled chemist with an illustrative example before him. Hence only one composition and process of making it will be described, and a few modifications suggested with the explanation that other compositions may be formed and other processes used by application of the general principles involved to other similar chemical substances or in a varied or modified manner.

A particular composition which is especially adapted to be stabilized and to form an excellent solvent according to the principles of this invention is a mixture composed principally of primary and secondary amyl chlorides formed by chlorination of commercial pentane and fractionation of the chlorinated product. The commercial pentane ordinarily used is comprised of approximately equal parts of normal pentane and iso-pentane and these mixed pentanes can be chlorinated to produce a mixture of monochlorides containing around 5 to 10% of tertiary amyl chloride, 40% to 45% of secondary amyl chlorides and primary amyl chlorides to constitute the remainder. A small amount of polychlorinated products and unsaturated products may also result. In addition, some of the original pentane will remain unchlorinated.

To remove the small quantities of the last mentioned compounds together with any other impurities that may be present, the newly formed amyl chlorides are subjected to a fractional distillation which removes impurities and the tertiary amyl chloride from the primary and secondary chlorides. These latter amyl chlorides may then be combined with approximately 20% of mixed amylenes to form the new solvent. Usually these mixed amylenes contain about 5% pentane, and the remainder is about half pentene-2 and half trimethyl ethylene.

In preparing the normal and secondary amyl chlorides the tertiary amyl chloride is, as stated above, removed by fractional distillation. By removing hydrogen and chlorine from this compound, trimethyl ethylene is produced which may be remixed with the normal and secondary chlorides, with or without additional amylene to effect the desired stabilization. The removal of the hydrogen and chlorine from the tertiary amyl chloride may be accomplished in any suitable manner, as by adding caustic soda or lime to the material and distilling off the trimethyl ethylene.

A feature of particular interest as regards the above process of preparing the amyl chlorides is that it offers an excellent opportunity for the incidental preparation of trimethyl ethylene which appears to be the more effective constituent of the mixed amylenes. In this connection it has been found as already stated that around 20% of mixed amylenes will act satisfactorily to prevent decomposition. This percent may vary from about 15% to about 30%. Further experience indicates that the trimethyl ethylene constitutes the more effective part of the mixed amylenes and that 10% to 20% of this compound will effect satisfactory stabilization.

A simplification of this process may be made, if desired, by adding lime to the orginal mixture of primary, secondary and tertiary amyl chlorides before separation or purification. The chlorides may then be distilled from the lime to remove impurities as before, but need not be fractionally separated from the tertiary product because this has been changed by action of the lime into trimethyl ethylene. If an insufficient amount of trimethyl ethylene results from this process additional amounts may be added, the composition of the original pentane changed to include more iso-pentane, or the chlorination process altered to produce more of the tertiary chloride.

Another opportunity for the obtaining of amylene incidental to this same general process occurs when alcohol is to be produced by hydrolysis of a part of the chlorides. During this process of hydrolysis some of the chlorides decompose to form amylenes and these may be isolated and subsequently used in the new composition. As the present process may often be practiced in a plant where alcohols are prepared by this method, the incidental production of amylenes in the alcohol manufacture may be turned to an immediate advantage in manufacturing the new composition.

Preferably after the amyl chlorides and amylene are mixed, although it may be done at any time after the formation of the chlorides, the chlorides are treated with activated carbon. Approximately 0.1–0.2% of the carbon may be dispersed in the composition at room temperature for a short time and removed by filtration or otherwise. The operation seems not only to remove any color that may be present but also aids considerably in stabilizing the composition and preventing future discoloration, possibly by removing certain acids and unstable compounds that will in time cause decomposition and discoloration. Although the inclusion of the activated carbon treatment is preferred and aids in producing a stable product it is to be understood that it may be omitted without departing from the scope of the invention.

The product prepared according to this invention functions well as a solvent for lacquer and like compositions at room temperatures, drying readily, costing relatively less than similar solvents and being sufficiently stable for such purposes. Specifically the product has been described as a mixture of amyl chlorides containing around 15% to 30% of mixed amylenes and having been treated with activated carbon. It is to be understood, however, that for both the stabilizing agent and the compounds to be stabilized there may be substituted others having generally similar properties, and that the proportion of the stabilizing agent to the main compounds in the composition may be varied according to the requirements in view of the changes.

For example, if the stabilizing agent is all trimethyl ethylene, a smaller quantity, around 10%–20%, will be sufficient. As another example, if hexyl chlorides are used instead of amyl chlorides the amount of the stabilizing material required, whether it be amylene, hexylene or some other similar compound, may be found to be quite different. Although the proportion to be used cannot be here specified for every conceivable instance, the changing of the proportion to suit the particular combination of compounds is within the scope of this invention. It is to be noted, however, that according to the present invention a substantial quantity of the stabilizing material, usually upwards of several percent, is always present.

I claim:

1. A composition of matter comprising a chloride of the group consisting of butyl, amyl, hexyl and heptyl chlorides stabilized by the addition thereto of over 10% of an olefin of the group consisting of butylene, amylene, hexylene and heptylene.

2. A composition of matter comprising amyl chloride stabilized by the addition thereto of over 10% of amylene.

3. A composition of matter comprising a mixtupre of amyl chlorides stabilized by the addition thereto of around 15 to 30% of a mixture of amylenes.

4. A composition of matter comprising amyl chloride stabilized by the addition thereto of around 10 to 20% of trimethyl ethylene.

5. A composition of matter comprising amyl chloride stabilized by the addition thereto to about 20% of amylene.

6. A composition of matter comprising amyl chloride stabilized by the addition thereto of over 10% of amylene and purified by treatment with activated carbon.

7. A composition of matter comprising amyl chloride stabilized by the addition thereto to about 20% of amylene and purified by treatment with activated carbon.

8. A composition of matter comprising a chloride of the group consisting of butyl, amyl, hexyl and heptyl chlorides stabilized by the addition thereto of over 10% of an olefin of the group consisting of butylene, amylene, hexylene and heptylene and purified by treatment with activated carbon.

JOHN F. OLIN.